(12) United States Patent
Bai et al.

(10) Patent No.: US 12,362,433 B2
(45) Date of Patent: Jul. 15, 2025

(54) BATTERY CELL, BATTERY, POWER CONSUMPTION DEVICE, AND BATTERY CELL MANUFACTURING DEVICE AND METHOD WITH FOLDING INSULATOR

(71) Applicant: CONTEMPORARY AMPEREX TECHNOLOGY (HONG KONG) LIMITED, Hong Kong (CN)

(72) Inventors: Lulu Bai, Ningde (CN); Xinxiang Chen, Ningde (CN); Ningsheng Wu, Ningde (CN); Quankun Li, Ningde (CN); Ting Zheng, Ningde (CN); Wenlin Zhou, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/795,695

(22) Filed: Aug. 6, 2024

(65) Prior Publication Data
US 2024/0396173 A1 Nov. 28, 2024

Related U.S. Application Data

(63) Continuation of application No. PCT/CN2022/078492, filed on Feb. 28, 2022.

(51) Int. Cl.
*H01M 50/463* (2021.01)
*H01M 10/04* (2006.01)
*H01M 50/593* (2021.01)

(52) U.S. Cl.
CPC ....... *H01M 50/463* (2021.01); *H01M 10/045* (2013.01); *H01M 50/593* (2021.01)

(58) Field of Classification Search
CPC . H01M 50/463; H01M 50/593; H01M 10/045
See application file for complete search history.

(56) References Cited

FOREIGN PATENT DOCUMENTS

| CN | 106684423 A | 5/2017 |
| CN | 113851769 A | 12/2021 |
| JP | 2017068961 A | 4/2017 |

(Continued)

OTHER PUBLICATIONS

JP 2020017376 English Translation (Year: 2020).*

(Continued)

*Primary Examiner* — Jimmy Vo
(74) *Attorney, Agent, or Firm* — ANOVA LAW GROUP, PLLC

(57) ABSTRACT

A battery cell includes a shell, an electrode assembly, and an insulator; the shell includes a bottom wall and a side wall disposed at a periphery of the bottom wall; the electrode assembly is accommodated in the shell; the insulator includes a first insulating portion and a second insulating portion that are connected, the first insulating portion is used for separating the electrode assembly from the bottom wall, the first insulating portion is provided with a through hole, and the second insulating portion is used for separating the electrode assembly from the side wall; and the insulator further includes a folding portion, which is disposed on the first insulating portion in a foldable manner, and is configured to be stacked with the first insulating portion to cover the through hole.

17 Claims, 7 Drawing Sheets

(56) References Cited

FOREIGN PATENT DOCUMENTS

| JP | 2020017376 A | * | 1/2020 |
| JP | 2020057502 A | | 4/2020 |

OTHER PUBLICATIONS

The World Intellectual Property Organization (WIPO) International Search Report and Written Opinion for PCT/CN2022/078492 Nov. 25, 2022 11 Pages (including translation).

* cited by examiner

BATTERY CELL, BATTERY, POWER CONSUMPTION DEVICE, AND BATTERY CELL MANUFACTURING DEVICE AND METHOD WITH FOLDING INSULATOR

CROSS-REFERENCE TO RELATED APPLICATION

This application is a continuation of International Application No. PCT/CN2022/078492, filed on Feb. 28, 2022, the entire content of which is incorporated herein by reference.

TECHNICAL FIELD

The present application relates to the field of battery technology, and particularly to a battery cell, a battery, a power consumption device, and a battery cell manufacturing device and method.

BACKGROUND ART

At present, with the rapid development of smart phones, tablet computers, electric vehicles, and the like, the application of lithium-ion batteries is increasingly widespread, which puts forward higher requirements for lithium-ion batteries. For example, batteries are required to have better safety performance, and internal short circuits in batteries are one of the main reasons for power safety issues.

The short circuits in batteries may generate excessive electric heat and high temperatures, and may cause fires or burnout of electrical appliances, so that property and life safety are threatened. Therefore, how to reduce the risk of short circuits in batteries has become an urgent problem to be solved in the field of battery technology.

SUMMARY

Embodiments of the present application provide a battery cell, a battery, a power consumption device, and a battery cell manufacturing device and method to reduce the risk of internal short circuits in battery cells.

First, an embodiment of the present application provides a battery cell, including a shell, an electrode assembly, and an insulator; the shell includes a bottom wall and a side wall disposed at a periphery of the bottom wall; the electrode assembly is accommodated in the shell; the insulator includes a first insulating portion and a second insulating portion that are connected, the first insulating portion is used for separating the electrode assembly from the bottom wall, the first insulating portion is provided with a through hole, and the second insulating portion is used for separating the electrode assembly from the side wall; and the insulator further includes a folding portion, the folding portion is disposed on the first insulating portion in a foldable manner, and the folding portion is configured to be stacked with the first insulating portion to cover the through hole.

In the foregoing technical solution, the folding portion is disposed on the first insulating portion in the foldable manner, where the folding portion folded relative to the first insulating portion may be in an unfolded state relative to the first insulating portion and in a stacked state relative to the first insulating portion. When the folding portion is in the unfolded state relative to the first insulating portion, the insulator may be positioned through the through hole to achieve cooperation and positioning with an assembly apparatus for assembling the battery cell, so as to position the insulator onto the assembly apparatus to improve assembly quality of the battery cell. When the folding portion is in the stacked state relative to the first insulating portion, the folding portion can cover the through hole, so that ions of the electrode assembly cannot arrive at the shell via the through hole, which reduces the risk of a short circuit inside the battery cell.

In some embodiments of the first aspect of the present application, the insulator includes a plurality of folding portions, which are stacked or arranged side by side.

In the foregoing technical solution, the insulator includes the plurality of folding portions stacked or arranged side by side. If the plurality of folding portions are stacked, a distance between the electrode assembly and the bottom wall can be increased, and the ions can be better prevented from arriving at the shell via the through hole, thereby reducing the risk of a short circuit inside the battery cell. If the plurality of folding portions are arranged side by side, coverage of the first insulator by the folding portions can be increased in the same plane to better prevent the ions from arriving at the shell via the through hole, thereby reducing the risk of a short circuit inside the battery cell.

In some embodiments of the first aspect of the present application, the first insulator is provided with a plurality of through holes, and each folding portion covers each through hole.

In the foregoing technical solution, each folding portion covers each through hole, so ions cannot arrive at the shell via any through hole, and the risk of a short circuit inside the battery cell is reduced. In addition, a quantity of the folding portions may be reduced to facilitate manufacturing of the insulator. If there is a plurality of folding portions, each through hole can be covered multiple times, which can further reduce the risk of arrival of the ions at the shell via the through holes.

In some embodiments of the first aspect of the present application, in a first direction, some of the plurality of folding portions are located on one side of the first insulating portion, the other of the plurality of folding portions are located on the other side of the first insulating portion, and the first direction is a thickness direction of the first insulating portion.

In the foregoing technical solution, some of the plurality of folding portions are located on one side of the first insulating portion in the thickness direction, the other of the plurality of folding portions are located on the other side of the first insulating portion in the thickness direction, and the plurality of folding portions can cover the through holes from two axial sides of the through holes, which can better prevent ions from arriving at the shell via the through holes, thereby reducing the risk of a short circuit inside the battery cell.

In some embodiments of the first aspect of the present application, the insulator includes two folding portions, the first insulating portion has two first edge portions arranged opposite in a second direction, one ends of the two folding portions in the second direction are separately connected to the two first edge portions in a foldable manner, and the second direction is perpendicular to the thickness direction of the first insulating portion.

In the foregoing technical solution, the two folding portions may be separately connected to the two first edge portions in the foldable manner, which facilitates folding of the folding portions relative to the first insulating portion and avoids mutual interference when the two folding portions are folded relative to the first insulating portion.

In some embodiments of the first aspect of the present application, the electrode assembly has two first side surfaces disposed opposite in the second direction; the second insulating portion includes two first separation portions, the two first separation portions are used for covering the two first side surfaces separately, the two first separation portions are connected to the two folding portions separately, a first end of the folding portion is connected to the first insulating portion in a foldable manner, and a second end, opposite to the first end, of the folding portion is connected to the first separation portion.

In the foregoing technical solution, the second insulating portion includes the two first separation portions connected to the folding portions separately, the first end of the folding portion is connected to the first insulating portion in the foldable manner, the second end of the folding portion is connected to the first separation portion, and the first end and the second end are opposite, whereby folding of the first separation portions relative to the folding portions is facilitated to separate the first side surfaces of the electrode assembly from the shell.

In some embodiments of the first aspect of the present application, a first crease is formed at a connection position between the folding portion and the first edge portion, and/or a second crease is formed at a connection position between the first separation portion and the folding portion; the first crease and the second crease extend in a third direction; and the thickness direction of the first insulating portion, the second direction, and the third direction are perpendicular to each other.

In the foregoing technical solution, the folding portion can be folded around the first crease relative to the first insulating portion, the first separation portion can be folded around the second crease relative to the folding portion, and extension directions of the first crease and the second crease are the same, which can avoid mutual interference between the folding action of the folding portion relative to the first insulating portion and the folding action of the first separation portion relative to the folding portion.

In some embodiments of the first aspect of the present application, the electrode assembly includes two second side surfaces arranged opposite in the third direction; the second insulating portion further includes second separation portions, two ends of each first separation portion in the third direction are connected with the second separation portions, and the second separation portions are used for covering the second side surfaces; and the thickness direction of the first insulating portion, the second direction, and the third direction are perpendicular to each other.

In the foregoing technical solution, the second insulator further includes second separation portions, and the second separation portions are used for separating the second side surfaces from the shell, so that the second insulating portion separates the side wall of the electrode assembly from the shell to reduce the risk of a short circuit inside the battery cell.

In some embodiments of the first aspect of the present application, the electrode assembly has two first side surfaces disposed opposite in the third direction; the second insulating portion includes two first separation portions, and the two first separation portions are used for covering the two first side surfaces separately; and the two first separation portions are separately connected to two opposite second edge portions of the first insulating portion in the third direction, and the thickness direction of the first insulating portion, the second direction, and the third direction are perpendicular to each other.

In the foregoing technical solution, the two folding portions are separately connected to the two first edge portions of the first insulator in the second direction in the foldable manner, and the two first separation portions are separately connected to the two opposite second edge portions of the first insulating portion in the third direction, which can reduce folding difficulty of the folding portions and the risk of mutual interference when the folding portions and the first separation portions are folded.

In some embodiments of the first aspect of the present application, the electrode assembly includes two second side surfaces arranged opposite in the second direction; the second insulating portion further includes second separation portions, two ends of each first separation portion in the second direction are connected with the second separation portions, and the second separation portions are used for covering the second side surfaces; and the thickness direction of the first insulating portion, the second direction, and the third direction are perpendicular to each other.

In the foregoing technical solution, the second insulator further includes second separation portions, and the second separation portions are used for separating the second side surfaces from the side wall of the shell, so that the second insulating portion separates the side wall of the electrode assembly from the shell to reduce the risk of a short circuit inside the battery cell.

In some embodiments of the first aspect of the present application, an inner surface of the side wall and an inner surface of the bottom wall are connected by an arc-shaped transition surface; and the first insulating portion and the folding portion are configured to change a height position of the electrode assembly relative to the bottom wall, so as to prevent the arc-shaped transition surface from extruding the electrode assembly.

In the foregoing technical solution, the first insulating portion is disposed between the bottom wall of the shell and the electrode assembly, which can not only separate the bottom wall from the electrode assembly to reduce the risk of a short circuit inside the battery cell, but also can change the height position of the electrode assembly relative to the bottom wall to prevent the arc-shaped transition surface from extruding the electrode assembly and reduce the risk of wrinkling of electrode plates due to interference between the electrode assembly and the arc-shaped transition surface.

In a second aspect, an embodiment of the present application provides a battery, including the battery cell provided in any embodiment of the first aspect.

In the foregoing technical solution, the through hole of the insulator of the battery cell is covered by the folding portion, and ions of the electrode assembly cannot arrive at the shell via the through hole, which reduces the risk of a short circuit inside the battery cell, thereby improving safety performance of the battery.

In a third aspect, an embodiment of the present application provides a power consumption device, including the battery provided in the embodiment of the second aspect.

In the foregoing technical solution, the power consumption device includes the battery provided in the embodiment of the second aspect, where the battery has low risk of internal short circuits and high safety performance, which can improve electrical safety of the power consumption device.

In a fourth aspect, an embodiment of the present application provides a battery cell manufacturing device, including a provision apparatus and an assembly apparatus; the provision apparatus is configured to provide a shell, an electrode assembly, and an insulator, where the shell includes a bottom wall and a side wall disposed at a periphery of the bottom wall, the insulator includes a first insulating portion and a second insulating portion that are connected, and the first insulating portion is provided with a through hole; and the assembly apparatus is configured to wrap the insulator at a periphery of the electrode assembly and dispose the electrode assembly inside the shell, so that the first insulating portion separates the electrode assembly from the bottom wall and the second insulating portion separates the electrode assembly from the side wall, where the insulator further includes a folding portion, the folding portion is disposed on the first insulating portion in a foldable manner, and the folding portion is configured to be stacked with the first insulating portion to cover the through hole.

In a fifth aspect, an embodiment of the present application provides a battery cell manufacturing method, including:

providing a shell, an electrode assembly, and an insulator, where the shell includes a bottom wall and a side wall disposed at a periphery of the bottom wall, the insulator includes a first insulating portion and a second insulating portion that are connected, and the first insulating portion is provided with a through hole;

wrapping the insulator at a periphery of the electrode assembly; and disposing the electrode assembly inside the shell, so that the first insulating portion separates the electrode assembly from the bottom wall and the second insulating portion separates the electrode assembly from the side wall, where the insulator further includes a folding portion, the folding portion is disposed on the first insulating portion in a foldable manner, and the folding portion is configured to be stacked with the first insulating portion to cover the through hole.

BRIEF DESCRIPTION OF DRAWINGS

In order to illustrate the technical solutions in the embodiments of the present application more clearly, brief description will be made below to the drawings required in the embodiments. It should be understood that the following drawings show only some embodiments of the present application and should not be regarded as limiting the scope, and other relevant drawings may be obtained based on these drawings by those of ordinary skill in the art without any creative efforts.

Figure 1:
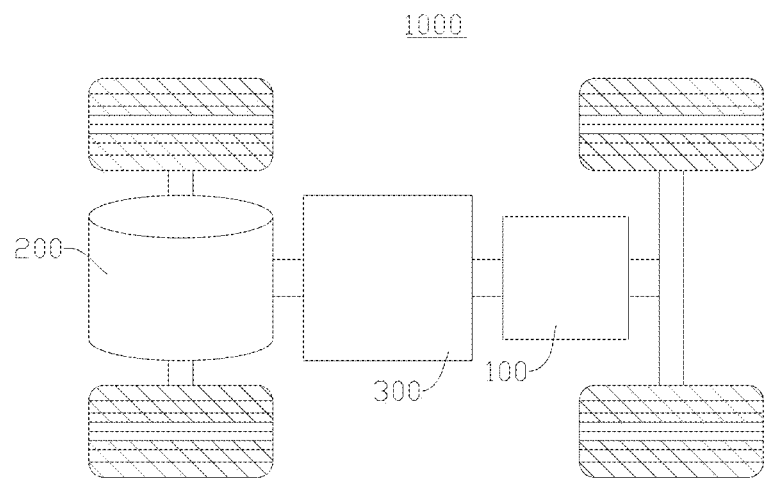
FIG. 1 is a schematic structural diagram of a vehicle according to some embodiments of the present application.

Reference signs: 1000—vehicle; 100—battery; 10—box body; 11—mounting space; 12—first portion; 13—second portion; 20—battery cell; 21—shell; 211—opening; 212—bottom wall; 213—side wall; 214—transition surface; 22—electrode assembly; 221—first side surface; 222—second side surface; 23—end cover assembly; 231—end cover; 232—electrode terminal; 233—end cover protector; 24—protective film; 25—current collecting member; 26—insulator; 261—first insulating portion; 2611—through hole; 2612—first edge portion; 2613—second edge portion; 262—second insulating portion; 2621—first separation portion; 2622—second separation portion; 263—folding portion; 2631—first end; 2632—second end; 264—gap; 265—first crease; 266—second crease; 267—third crease; 268—fourth crease; 269—perforation; 200—controller; 300—motor; 2000—battery cell manufacturing device; 2100—provision apparatus; 2200—assembly apparatus; X—first direction; Y—second direction; Z—third direction; I—straight portion; II—bent portion.

DETAILED DESCRIPTION OF EMBODIMENTS

In order to make the objectives, technical solutions and advantages of the embodiments of the present application clearer, the technical solutions in the embodiments of the present application will be described clearly and completely below in conjunction with the accompanying drawings in the embodiments of the present application. Apparently, the described embodiments are part of the embodiments of the present application, not all of them. Components in the embodiments of the present application, typically described and shown in the drawings, may be arranged and designed in various different configurations.

Therefore, detailed descriptions of the embodiments of the present application provided in the drawings below are not intended to limit the scope of protection of the present application, but only to represent the selected embodiments of the present application. All other embodiments obtained by those of ordinary skill in the art based on the embodiments of the present application without creative efforts shall fall within the scope of protection of the present application.

It should be noted that the embodiments in the present application and the features of the embodiments may be combined with each other on a non-conflict basis.

It should be noted that similar reference signs and letters in the following drawings represent similar terms, so once a term is defined in a drawing, further discussion on this term is not required in the follow-up drawings.

In the description of the embodiments of the present application, it should be noted that indicated orientations or positional relationships are based on orientations or positional relationships shown in the drawings, or commonly placed orientations or positional relationships during the use of products in the present application, or orientations or positional relationships commonly understood by those skilled in the art, are merely for the convenience of describing the present application and simplifying the description, rather than indicating or implying that the apparatus or element referred to must have a specific orientation or be constructed and operated in a specific orientation, and therefore cannot be understood as limitations on the present application. In addition, the terms "first", "second", "third", and the like are merely for the sake of distinguishing the description, and cannot be understood as indicating or implying relative importance.

At present, based on the development of the market situation, the application of power batteries is increasingly widespread. Power batteries are not only used in energy storage power systems of water power, firepower, wind power and solar power plants and the like, but also widely used in many fields of electric vehicles such as electric bicycles, electric motorcycles, and electric vehicles, military equipment, aerospace, and the like. With the continuous expansion of the application field of power batteries, their market demand is also constantly expanding.

A battery cell includes a shell, an electrode assembly, and an insulator, where the insulator is used for separating the electrode assembly from the shell to avoid a contact short circuit between the electrode assembly and the shell. In order to facilitate assembly of the battery cell, a portion, used for separating the electrode assembly from a bottom wall of the shell, of the insulator is provided with a through hole, and the through hole is used for cooperating and positioning with an assembly apparatus for assembling the battery cell to position the insulator onto the assembly apparatus, so as to improve assembly quality.

The inventor discovered that ions of the electrode assembly may arrive at the shell via the through hole, leading to a short circuit inside the battery cell and causing safety issues. To prevent the ions from arriving at the shell via the through hole, the through hole may be sealed by pasting a tape on the insulator. However, the tape immersed in an electrolyte for a long term may fall off to cause sealing failure.

Based on the foregoing considerations, in order to reduce the risk of ions passing through the through hole, the inventor designed a battery cell through in-depth research. An insulator of the battery cell includes a first insulating portion and a second insulating portion that are connected, the first insulating portion is used for separating an electrode assembly from a bottom wall of a shell, the first insulating portion is provided with a through hole, and the second insulating portion is used for separating the electrode assembly from a side wall of the shell. The insulator further includes a folding portion, the folding portion is disposed on the first insulating portion in a foldable manner, and the folding portion is configured to be stacked with the first insulating portion to cover the through hole.

The battery cell disclosed in the embodiments of the present application may be used, but is not limited to, in a power consumption device such as a vehicle, a ship or an aircraft. A power system of the power consumption device may be composed of the battery cell, the battery, and the like disclosed in the present application. In this case, the risk of ions passing through the through hole is reduced, the risk of internal short circuit in the battery is reduced, and the safety performance of the battery cell is thereby improved.

Technical solutions described in the embodiments of the present application are applicable to batteries and power consumption devices using the batteries.

The power consumption devices may be vehicles, mobile phones, portable devices, notebook computers, ships, spacecrafts, electric toys, electric tools, and the like. The vehicles may be oil-fueled vehicles, gas-fueled vehicles, or new energy vehicles, and the new energy vehicles may be pure electric vehicles, hybrid electric vehicles, extended range vehicles, or the like; the spacecrafts include airplanes, rockets, space shuttles, spaceships, and the like; the electric toys include fixed or mobile electric toys, such as game consoles, electric car toys, electric boat toys, and electric plane toys; and the electric tools include electric metal cutting tools, electric grinding tools, electric assembly tools, and railway electric tools, such as electric drills, electric grinders, electric wrenches, electric screwdrivers, electric hammers, electric impact drills, concrete vibrators, and electric planers. The embodiments of the present application do not impose special limitations on the foregoing power consumption devices.

For convenient description, the following embodiments are described by an example of a vehicle 1000 as a power consumption device.

With reference to FIG. 1, a battery 100 is provided inside the vehicle 1000. The battery 100 may be disposed at a bottom, head or tail of the vehicle 1000. The battery 100 may be used for supplying power to the vehicle 1000. For example, the battery 100 may be used as an operation power supply of the vehicle 1000.

The vehicle 1000 may further include a controller 200 and a motor 300. The controller 200 is used for controlling the battery 100 to supply power to the motor 300, for example, for the working power demand of the vehicle 1000 during startup, navigation and running.

In some embodiments of the present application, the battery 100 may be used not only as an operation power supply of the vehicle 1000, but also as a driving power supply of the vehicle 1000 to replace or partially replace fuel or natural gas to provide driving power for the vehicle 1000.

Figure 2:
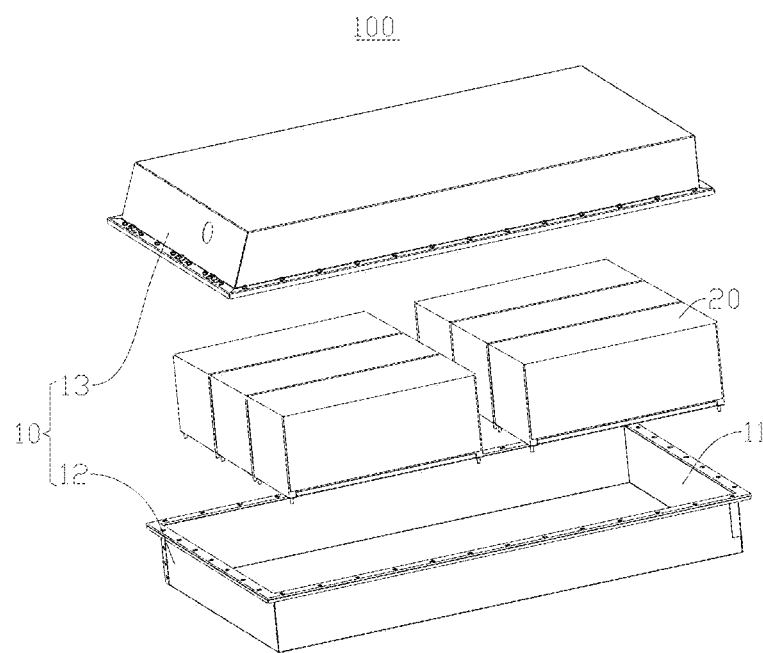
FIG. 2 is a schematic structural diagram of a battery according to some embodiments of the present application.

With reference to FIG. 2, the battery 100 includes a box body 10 and a battery cell 20, where the battery cell 20 is accommodated in the box body 10.

The box body 10 is used for providing a mounting space 11 for the battery cell 20. In some embodiments, the box body 10 may include a first portion 12 and a second portion 13, and the first portion 12 and the second portion 13 cover each other to confine the mounting space 11 for accommodating the battery cell 20. Of course, the junction between the first portion 12 and the second portion 13 may be sealed by a sealing element (not shown), which may be a sealing ring, a sealant, or the like.

The first portion 12 and the second portion 13 may be in various shapes, such as cuboid or cylindrical. The first portion 12 may be opened on one side to form a hollow structure with an accommodating cavity for accommodating the battery cell 20, the second portion 13 may also be opened on one side to form a hollow structure with an accommodating cavity for accommodating the battery cell 20, and the opening side of the second portion 13 covers the opening side of the first portion 12 to form the box body 10 with the mounting space 11. Alternatively, the first portion 12 is opened on one side to form a hollow structure with an accommodating cavity for accommodating the battery cell 20, the second portion 13 is of a plate-like structure, and the second portion 13 covers the opening side of the first portion 12 to form the box body 10 with the mounting space 11.

There may be one or more battery cells 20 in the battery 100. If there is a plurality of battery cells 20, the plurality of battery cells 20 may be connected in series, parallel, or series and parallel. The series and parallel connection refers to both series and parallel connection in the plurality of battery cells 20. The plurality of battery cells 20 may be directly connected in series, parallel, or series and parallel together, and then the whole composed of the plurality of battery cells 20 is accommodated in the box body 10. Alternatively, the plurality of battery cells 20 may be first connected in series, parallel, or series and parallel to form a battery module, and then a plurality of battery modules may be connected in series, parallel, or series and parallel to form a whole accommodated in the box body 10. The battery cell 20 may be cylindrical, flat, cuboid, or in other shapes. FIG. 2 illustrates that the battery cell 20 is square.

In some embodiments, the battery 100 may further include a current collecting component (not shown), and the plurality of battery cells 20 may be electrically connected through the current collecting component to implement the series, parallel, or series and parallel connection of the plurality of battery cells 20.

Figure 3:
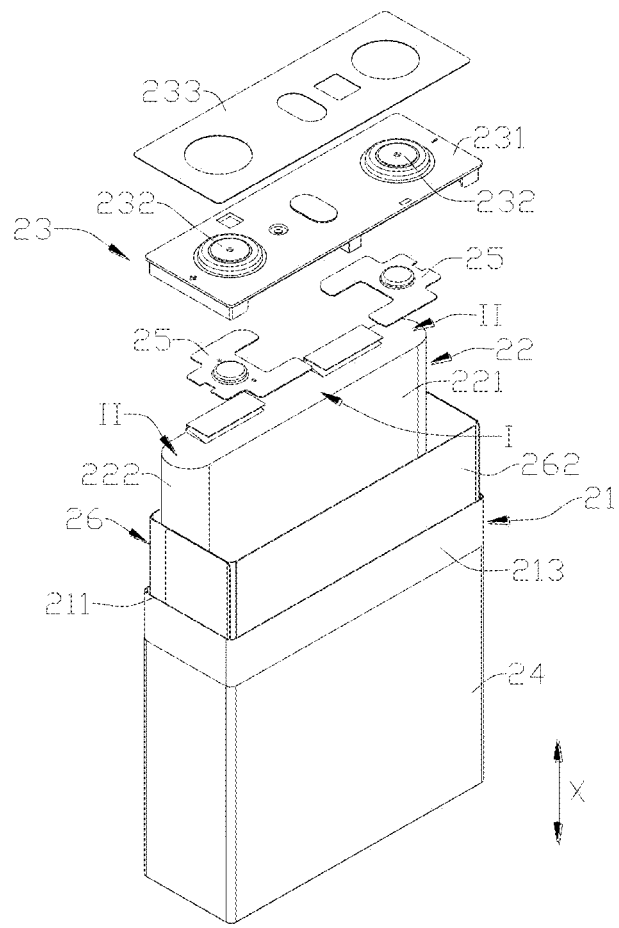
FIG. 3 is an exploded view of a battery cell according to some embodiments of the present application.

With reference to FIG. 3, the battery cell 20 may include a shell 21, an electrode assembly 22, and an end cover assembly 23. The shell 21 has an opening 211, the electrode assembly 22 is accommodated in the shell 21, and the end cover assembly 23 is used for covering the opening 211.

The shell 21 may be in various shapes, such as cylindrical or cuboid. The shape of the shell 21 may be determined according to a specific shape of the electrode assembly 22. For example, if the electrode assembly 22 is of a cylindrical structure, the shell 21 may be of a cylindrical structure; or if the electrode assembly 22 is of a cuboid structure, the shell 21 may be of a cuboid structure. FIG. 3 illustrates that the shell 21 and the electrode assembly 22 are square.

A material of the shell 21 may be various, such as copper, iron, aluminum, stainless steel, or aluminum alloy, and is not specially limited by the embodiments of the present application.

In some embodiments, a protective film 24 is further disposed on an outer surface of the shell 21, and the protective film 24 wraps the outer surface of the shell 21. The protective film 24 can achieve functions of insulation, high temperature resistance, and the like. The protective film 24 may be a blue film.

The electrode assembly 22 may include a positive plate (not shown), a negative plate (not shown), and a separator (not shown). The electrode assembly 22 may be of a winding structure formed by winding the positive plate, the separator, and the negative plate, or a stacked structure formed by stacking the positive plate, the separator, and the negative plate. The electrode assembly 22 further includes a positive tab (not shown) and a negative tab (not shown), a positive current collector not coated with a positive active material layer in the positive plate may be used as the positive tab, and a negative current collector not coated with a negative active material layer in the negative plate may be used as the negative tab.

The end cover assembly 23 includes an end cover 231 and an electrode terminal 232, where the electrode terminal 232 is disposed on the end cover 231. The end cover 231 is used for sealing the opening 211 of the shell 21 to form a closed accommodating space (not shown), which is used for accommodating the electrode assembly 22. The accommodating space is also used for accommodating an electrolyte, such as an electrolyte solution. The end cover assembly 23 serves as a component for outputting electrical energy of the electrode assembly 22. The electrode terminal 232 in the end cover assembly 23 is used for electrical connection with the electrode assembly 22, that is, the electrode terminal 232 is electrically connected to a tab of the electrode assembly 22. For example, the electrode terminal 232 is connected to the tab through a current collecting member 25 to achieve the electrical connection between the electrode terminal 232 and the tab.

It should be noted that the shell 21 may have one or two openings 211. If the shell 21 has one opening 211, there may also be one end cover assembly 23, two electrode terminals 232 may be disposed in the end cover assembly 23, the two electrode terminals 232 are used for electrical connection with the positive tab and negative tab of the electrode assembly 22 separately, and the two electrode terminals 232 in the end cover assembly 23 are a positive electrode terminal 232 and a negative electrode terminal 232 separately. If the shell 21 has two openings 211, for example, two openings 211 are disposed on two opposite sides of the shell 21, there may also be two end cover assemblies 23, and the two end cover assemblies 23 cover the two openings 211 of the shell 21 separately. In this case, the electrode terminal 232 in one of the end cover assemblies 23 may be used as a positive electrode terminal for electrical connection with the positive tab of the electrode assembly 22; and the electrode terminal 232 in the other end cover assembly 23 may be used as a negative electrode terminal used for electrical connection with the negative plate of the electrode assembly 22.

In some embodiments, the end cover assembly 23 further includes an end cover protector 233, and the end cover protector 233 is mounted on a surface of the end cover 231 to protect the end cover 231.

Referring to FIGS. 3, 4, 5, and 6, in some embodiments, the battery cell 20 includes a shell 21, an electrode assembly 22, and an insulator 26; the shell 21 includes a bottom wall 212 and a side wall 213 disposed at a periphery of the bottom wall 212; the electrode assembly 22 is accommodated in the shell 21; the insulator 26 includes a first insulating portion 261 and a second insulating portion 262 that are connected, the first insulating portion 261 is used for separating the electrode assembly 22 from the bottom wall 212, the first insulating portion 261 is provided with a through hole 2611, and the second insulating portion 262 is used for separating the electrode assembly 22 from the side wall 213; and the insulator 26 further includes a folding portion 263, the folding portion 263 is disposed on the first insulating portion 261 in a foldable manner, and the folding portion 263 is configured to be stacked with the first insulating portion 261 to cover the through hole 2611.

The opening 211 of the shell 21 is disposed opposite to the bottom wall 212. The first insulating portion 261 is located between the electrode assembly 22 and the bottom wall 212 to separate the electrode assembly 22 from the bottom wall 212, so as to avoid a short circuit inside the battery cell 20 due to contact between the electrode assembly 22 and the bottom wall 212.

The folding portion 263 may be disposed on the first insulating portion 261 in a foldable manner, indicating that the folding portion 263 can rotate and be folded around a crease relative to the first insulating portion 261. The folding portion 263 can be folded relative to the first insulating portion 261 to ensure that the first insulating portion 261 and the folding portion 263 are in a stacked state and unfolded state. The stacked state indicates that both the folding portion 263 and the first insulating portion 261 are located between the electrode assembly 22 and the bottom wall 212, and the folding portion 263 is located on a side, away from the electrode assembly 22, of the first insulating portion 261 and/or on a side, facing the electrode assembly 22, of the first insulating portion 261. The unfolded state refers to another state of the folding portion 263 and the first insulating portion 261 except the stacked state, including a coplanar state of the folding portion 263 and the first insulating portion 261.

The first insulating portion 261 and the folding portion 263 are both of flat structures. In other embodiments, the folding portion 263 may alternatively be in other structural forms, for example, the folding portion 263 is in a latch form, and after being folded relative to the first insulating portion 261, the folding portion 263 can be located on the side, facing or away from the electrode assembly 22, of the first insulating portion 261 and inserted into the through hole 2611.

After the folding portion 263 is stacked with the first insulating portion 261, the folding portion 263 and the first insulating portion 261 may be fixed, for example, the folding portion 263 and the first insulating portion 261 are bonded together by an adhesive to maintain the folding portion 263 and the first insulating portion 261 in the stacked state; or the folding portion 263 and the first insulating portion 261 may not be fixed, and the folding portion 263 and the first insulating portion 261 may be maintained in the stacked state by means of gravity of the electrode assembly 22.

The first insulating portion 261 and the second insulating portion 262 may be integrally formed, or separated and then connected into an integral structure. The folding portion 263 and the first insulating portion 261 may be integrally formed, or separated and then connected into an integral structure.

The folding portion 263 is disposed on the first insulating portion 261 in the foldable manner, where the folding portion 263 folded relative to the first insulating portion 261 may be in the unfolded state relative to the first insulating portion 261 and in the stacked state relative to the first insulating portion 261. When the folding portion 263 is in the unfolded state relative to the first insulating portion 261, the insulator 26 may be positioned through the through hole 2611 to achieve cooperation and positioning with the assembly apparatus 2200 for assembling the battery cell 20, so as to position the insulator 26 onto the assembly apparatus 2200 to improve the assembly quality of the battery cell 20. When the folding portion 263 is in the stacked state relative to the first insulating portion 261, the folding portion 263 can cover the through hole 2611, so that ions of the electrode assembly 22 cannot arrive at the shell 21 via the through hole 2611, which reduces the risk of a short circuit Inside the battery cell 20.

Figure 4:
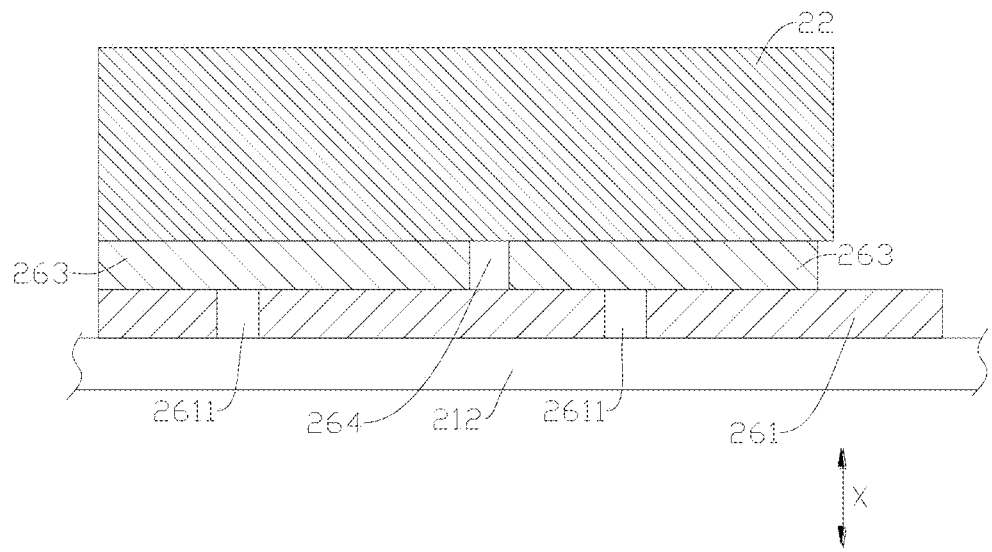
FIG. 4 is a partial schematic diagram of the battery cell according to some embodiments of the present application.
Figure 5:
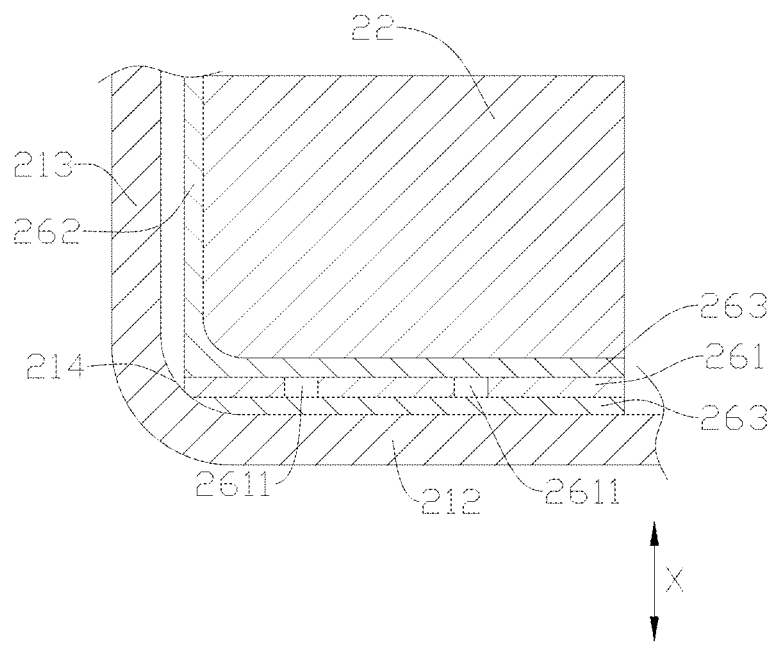
FIG. 5 is a partial schematic diagram of the battery cell according to other embodiments of the present application.
Figure 6:
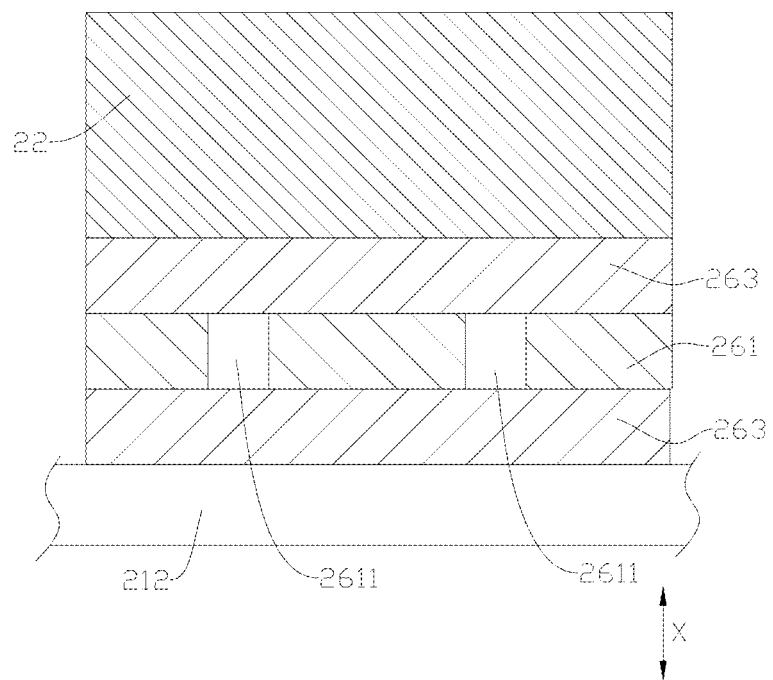
FIG. 6 is a partial schematic diagram of the battery cell according to other embodiments of the present application (a side wall of a shell is not shown)

Referring to FIGS. 4, 5, and 6, in some embodiments, the insulator 26 includes a plurality of folding portions 263, and the plurality of folding portions 263 are stacked or arranged side by side.

The plurality refers to two or more.

For example, the insulator 26 includes two folding portions 263. As shown in FIG. 4, the two folding portions 263 are arranged side by side, indicating that the two folding portions 263 are arranged on the same side of the first insulating portion 261 in a direction from the bottom wall 212 to the electrode assembly 22 (namely, a first direction X), and the two folding portions 263 are in contact with a surface, facing the electrode assembly 22, of the first insulating portion 261 or the two folding portions 263 are in contact with a surface, away from the electrode assembly 22, of the first insulating portion 261. In the side-by-side direction of the two folding portions 263, there may be a gap 264 or may not be a gap 264 between the two folding portions 263. FIG. 4 shows a gap 264 in the side-by-side direction of the two folding portions 263.

As shown in FIG. 5 and FIG. 6, the two folding portions 263 are stacked, indicating that the two folding portions 263 are stacked in the direction from the bottom wall 212 to the electrode assembly 22 (namely, the first direction X), and one of the two folding portions 263 is closer to the electrode assembly 22 than the other. For example, the two folding portions 263 are stacked on the side, facing the electrode assembly 22, of the first insulating portion 261, or the two folding portions 263 are stacked on the side, away from the electrode assembly 22, of the first insulating portion 261, or one of the two folding portions 263 is located on the side, facing the electrode assembly 22, of the first insulating portion 261 and the other is located on the side, away from the electrode assembly 22, of the first insulating portion 261. FIG. 5 and FIG. 6 show that the two folding portions 263 are located on two opposite sides of the first insulating portion 261 separately. Relevant circumstances of the present application will be described below by an example of two stacked folding portions 263.

Of course, in the embodiments where the insulator 26 includes two or more folding portions 263, some folding portions 263 among the plurality of folding portions 263 may be stacked, and the stacked folding portions 263 are arranged side by side with the other folding portions 263.

The insulator 26 includes a plurality of folding portions 263 stacked or arranged side by side. If the plurality of folding portions 263 are stacked, a distance between the electrode assembly 22 and the bottom wall 212 can be increased, and the ions can be better prevented from arriving at the shell 21 via the through hole 2611, thereby reducing the risk of a short circuit inside the battery cell 20. If the plurality of folding portions 263 are arranged side by side, coverage of the first insulator 26 by the folding portions 263 can be increased in the same plane to better prevent the ions from arriving at the shell 21 via the through hole 2611, thereby reducing the risk of a short circuit inside the battery cell 20.

Referring to FIG. 5 and FIG. 6, in some embodiments, the first insulating portion 261 is provided with a plurality of through holes 2611, and each folding portion 263 covers each through hole 2611.

The plurality refers to two or more. The area of a surface, facing the first insulating portion 261, of the folding portion 263 should be large enough, so that the folding portion 263 can cover each through hole 2611 simultaneously. In other embodiments, some through holes 2611 among the plurality of through holes 2611 are covered by one folding portion 263, and the other through holes 2611 among the plurality of through holes 2611 are covered by the other folding portion 263. Of course, a quantity of the folding portions 263 may alternatively be set according to a quantity of the through holes 2611, the folding portions 263 and the through holes 2611 correspond one to one, and each folding portion 263 is used for covering the corresponding through hole 2611.

In other embodiments, there may alternatively be one through hole 2611.

Each folding portion 263 covers each through hole 2611, so ions cannot arrive at the shell 21 via any through hole 2611, and the risk of a short circuit inside the battery cell 20 is reduced. In addition, the quantity of the folding portions 263 may be reduced to facilitate manufacturing of the insulator 26. If there is a plurality of folding portions 263, each through hole 2611 can be covered multiple times, which can further reduce the risk of arrival of the ions at the shell 21 via the through holes 2611.

Referring to FIG. 5 and FIG. 6, in some embodiments, in the first direction X, some of the plurality of folding portions 263 are located on one side of the first insulating portion 261, the other of the plurality of folding portions 263 are located on the other side of the first insulating portion 261, and the first direction X is a thickness direction of the first insulating portion 261.

The first direction X is consistent with the thickness direction of the first insulating portion 261. When the folding portion 263 and the first insulating portion 261 are in the stacked state, a stacking direction of the folding portion 263 and the first insulating portion 261 is the first direction X. For example, the insulator 26 includes two folding portions 263, and the first insulating portion 261 is located between the two folding portions 263. That is, when the folding portion 263 and the first insulating portion 261 are in the stacked state, the two folding portions 263 are located on two sides of the first insulating portion 261 in the first direction X separately. In other embodiments, the two folding portions 263 may alternatively be located on the same side of the first insulating portion 261 in the first direction X.

In an embodiment where the insulator 26 includes two or more folding portions 263, the first insulating portion 261 may have at least two folding portions 263 on at least one side in the first direction X, and the folding portions 263 on the same side of the first insulating portion 261 may be stacked or arranged side by side.

Some of the plurality of folding portions 263 are located on one side of the first insulating portion 261 in the thickness direction, the other of the plurality of folding portions 263 are located on the other side of the first insulating portion 261 in the thickness direction, and the two folding portions 263 can cover the through hole 2611 from two axial sides of the through hole 2611, which can better prevent ions from arriving at the shell 21 via the through hole 2611, thereby reducing the risk of a short circuit inside the battery cell 20.

Figure 7:
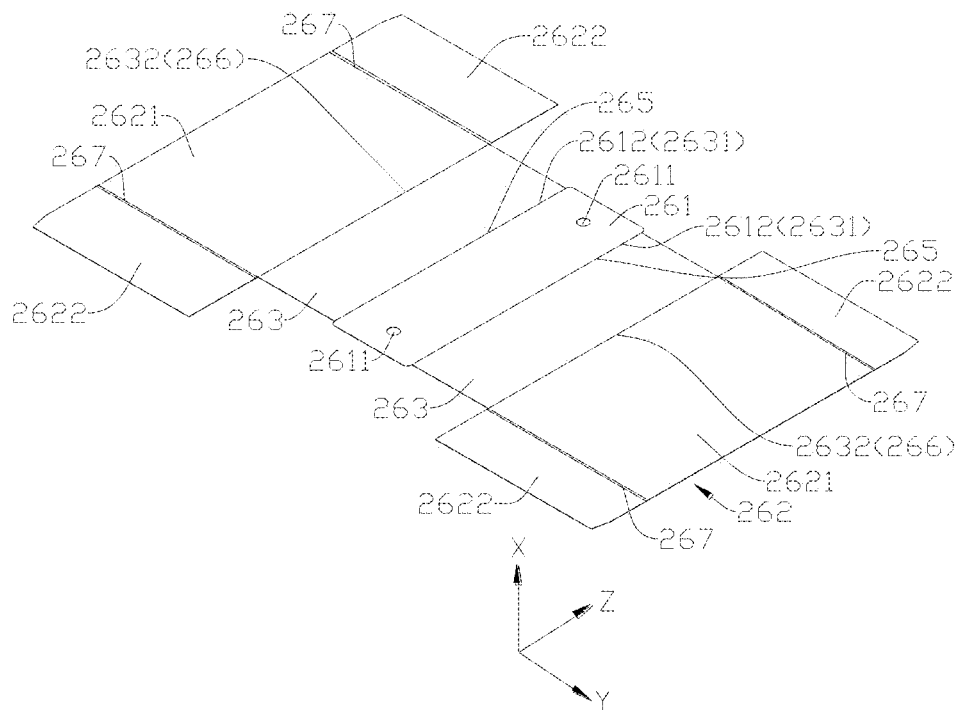
FIG. 7 is a schematic diagram of an unfolded state of an insulator according to some embodiments of the present application.

As shown in FIG. 7, in some embodiments, the insulator 26 includes two folding portions 263, the first insulating portion 261 has two first edge portions 2612 arranged opposite in a second direction Y, one ends of the two folding portions 263 in the second direction Y are separately connected to the two first edge portions 2612 in a foldable manner, and the second direction Y is perpendicular to the thickness direction of the first insulating portion 261.

One ends of the two folding portions 263 in the second direction Y are separately connected to the two first edge portions 2612 in a foldable manner, indicating that one ends of the folding portions 263 in the second direction Y are connected to the first edge portions 2612 when the folding portions 263 are stacked with the first insulating portion 261.

Figure 8:
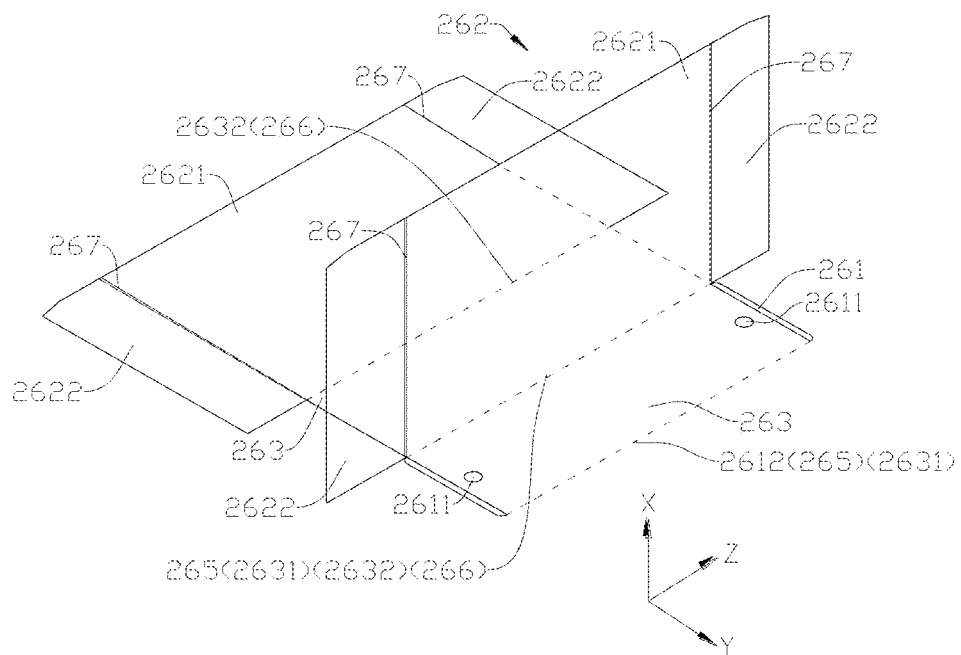
FIG. 8 is a schematic diagram after a folding portion of the insulator in FIG. 7 is folded relative to the first insulator.
Figure 9:
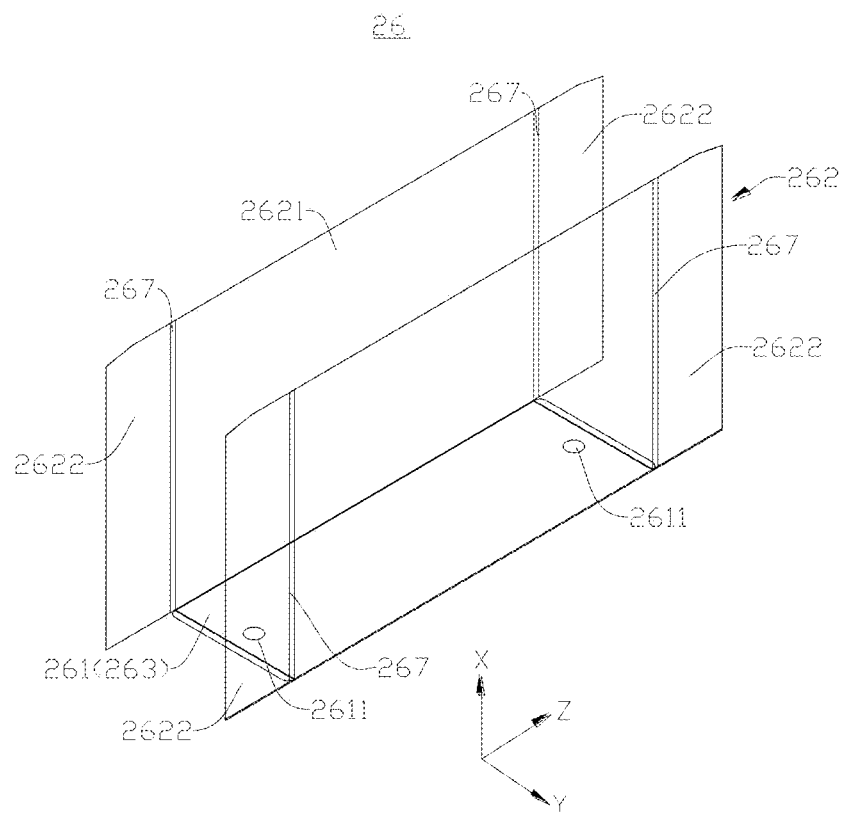
FIG. 9 is a schematic diagram after another folding portion of the insulator in FIG. 8 is folded relative to the first insulator.

In order to ensure that the two folding portions 263 are separately located on the two sides of the first insulating portion 261 in the first direction X, folding directions of the two folding portions 263 relative to the first insulating portion 261 are opposite. As shown in FIG. 8, one folding portion 263 in the two folding portions 263 is located on one side of the first insulating portion 261 in the first direction X after being folded relative to the first insulating portion 261 in a first folding direction. As shown in FIG. 9, the other folding portion 263 in the two folding portions 263 is located on the other side of the first insulating portion 261 in the first direction X after being folded relative to the first insulating portion 261 in a second folding direction. The first folding direction is opposite to the second folding direction, for example, the first folding direction is clockwise, and the second folding direction is counterclockwise.

Of course, the two folding portions 263 may alternatively be connected to the same first edge portion 2612 in a foldable manner.

The two folding portions 263 may be separately connected to the two first edge portions 2612 in the foldable manner, which facilitates folding of the folding portions 263 relative to the first insulating portion 261 and avoids mutual interference when the two folding portions 263 are folded relative to the first insulating portion 261.

Referring to FIGS. 7, 8, and 9, in some embodiments, the electrode assembly 22 has two first side surfaces 221 (shown in FIG. 3) disposed opposite in the second direction Y; the second insulating portion 262 includes two first separation portions 2621, the two first separation portions 2621 are used for covering the two first side surfaces 221 separately, the two first separation portions 2621 are connected to the two folding portions 263 separately, a first end 2631 of the folding portion 263 is connected to the first insulating portion 261 in a foldable manner, and a second end 2632, opposite to the first end 2631, of the folding portion 263 is connected to the first separation portion 2621.

In this embodiment, the first separation portion 2621 is connected to the second end 2632 of the folding portion 263 in a foldable manner, so that the first separation portion 2621 can rotate and be folded around a crease relative to the folding portion 263.

In an embodiment where the electrode assembly 22 is square, the electrode assembly 22 includes a straight portion I and two bent portions II, where the two bent portions II are connected to two ends of the straight portion I separately. The straight portion I has two opposite outer side surfaces in the thickness direction of electrode assembly 22. The thickness direction of the electrode assembly 22 is perpendicular to an opposite arrangement direction of the two bent portions II. The two first side surfaces 221 may be the two outer side surfaces of the straight portion I or outer side surfaces of the two bent portions II. For example, the two first side surfaces 221 may be the two outer side surfaces of the straight portion I. When the two first separation portions 2621 are folded relative to the first insulating portion 261, the first separation portions 2621 can be folded to parallel to the two outer side surfaces of the straight portion I, and the two first separation portions 2621 can cover the two outer side surfaces of the straight portion I separately to separate the first side surfaces 221 from the side wall 213 of the shell 21, thereby avoiding a short circuit inside the battery cell 20 due to contact between the first side surfaces 221 and the side wall 213.

In this embodiment, two ends of the first insulating portion 261 may be flush or not flush with two ends of the folding portion 263 in a third direction Z. For example, as shown in FIG. 7 to FIG. 9, in the third direction Z, the two ends of the first insulating portion 261 are not flush, and the two ends of the first insulating portion 261 extend the two ends of the folding portion 263.

The second insulating portion 262 includes the two first separation portions 2621 connected to the folding portions 263 separately, the first end 2631 of the folding portion 263 is connected to the first insulating portion 261 in the foldable manner, the second end 2632 of the folding portion 263 is connected to the first separation portion 2621, and the first end 2631 and the second end 2632 are opposite, whereby folding of the first separation portions 2621 relative to the folding portions 263 is facilitated to separate the first side surfaces 221 of the electrode assembly 22 from the shell 21.

Referring to FIGS. 7, 8, and 9, in some embodiments, a first crease 265 is formed at a connection position between the folding portion 263 and the first edge portion 2612, and/or a second crease 266 is formed at a connection position between the first separation portion 2621 and the folding portion 263; the first crease 265 and the second crease 266 extend in the third direction Z; and the thickness direction of the first insulating portion 261, the second direction Y, and the third direction Z are perpendicular to each other.

Alternatively, only the first crease 265 is formed at the connection position between the folding portion 263 and the first edge portion 2612, the second crease 266 is not formed at the connection position between the first separation portion 2621 and the folding portion 263, and when the first separation portion 2621 is required to be folded relative to the folding portion 263, a folding position is determined according to actual needs, and a crease is formed after folding. Alternatively, only the second crease 266 is formed at the connection position between the first separation portion 2621 and the folding portion 263, the first crease 265 is formed at the connection position between the folding portion 263 and the first edge portion 2612, and when the folding portion 263 is required to be folded relative to the first edge portion 2612, a folding position is determined according to actual needs, and a crease is formed after folding. Alternatively, the first crease 265 is formed at the connection position between the folding portion 263 and the first edge portion 2612, the second crease 266 is formed at the connection position between the first separation portion 2621 and the folding portion 263, the folding portion 263 may be folded around the first crease 265 relative to the first insulating portion 261, and the first separation portion 2621 may be folded around the second crease 266 relative to the folding portion 263.

As shown in FIG. 8 and FIG. 9, a width of the folding portion 263 in the second direction Y is the same as that of the first insulating portion 261 in the second direction Y. After the folding portion 263 is stacked with the first insulating portion 261, a projection of the second crease 266 formed at the connection position between the folding portion 263 and the first separation portion 2621 overlaps with a projection of the first crease 265 formed at the connection position between the folding portion 263 and the first insulating portion 261 in the first direction X.

The first crease 265 and the second crease 266 are formed before folding, so the folding positions can be clearly and accurately known and the folding is easier. The folding portion 263 can be folded around the first crease 265 relative to the first insulating portion 261, the first separation portion 2621 can be folded around the second crease 266 relative to the folding portion 263, and extension directions of the first crease 265 and the second crease 266 are the same, which can avoid mutual interference between the folding action of the folding portion 263 relative to the first insulating portion 261 and the folding action of the first separation portion 2621 relative to the folding portion 263.

Figure 10:
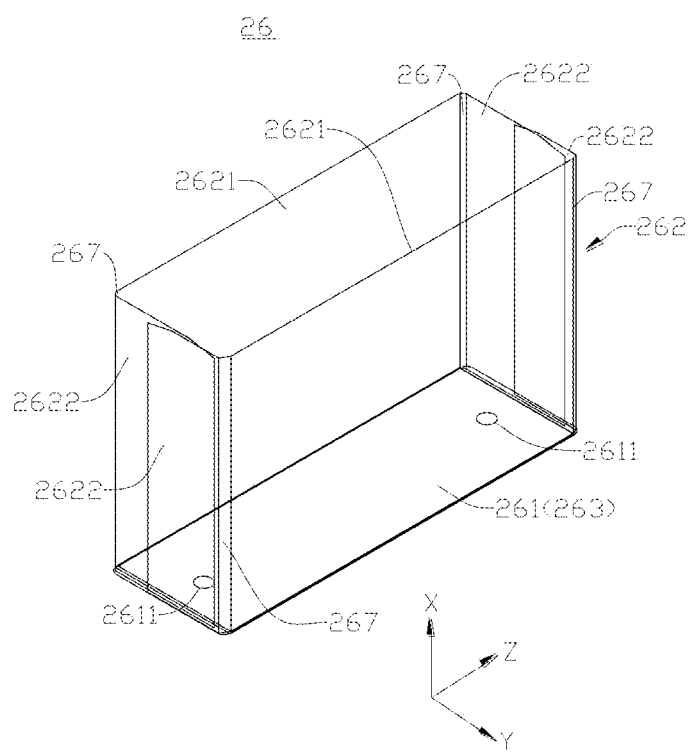
FIG. 10 is a schematic diagram after the insulator in FIG. 7 is fully folded.

Referring to FIG. 9 and FIG. 10, in some embodiments, the electrode assembly 22 includes two second side surfaces 222 arranged opposite in the third direction Z (as shown in FIG. 3); the second insulating portion 262 further includes second separation portions 2622, two ends of each first separation portion 2621 in the third direction Z are connected with the second separation portions 2622, and the second separation portions 2622 are used for covering the second side surfaces 222; and the thickness direction of the first insulating portion 261, the second direction Y, and the third direction Z are perpendicular to each other.

In this embodiment, the second separation portion 2622 is connected to the first separation portion 2621 in a foldable manner, so that the second separation portion 2622 can rotate and be folded around a crease relative to the first separation portion 2621.

In the embodiment where the electrode assembly 22 is square and the two first side surfaces 221 are the two outer side surfaces of the straight portion I, the two second side surfaces 222 are the outer side surfaces of the two bent portions II. The second separation portions 2622 are used for covering surfaces of the bent portions II. In the third direction Z, the two second separation portions 2622 located on the same side as the two first separation portions 2621 jointly cover the same second side surface 222, and the two second separation portions 2622 covering the same second side surface 222 overlap with each other in the second direction Y to fully cover the second side surface 222. The two second separation portions 2622 covering the same second side surface 222 may be fixed or not fixed.

A third crease 267 is formed at the connection position between the second separation portion 2622 and the first separation portion 2621. The second separation portion 2622 may be folded around the third crease 267 relative to the second separation portion 2622. The third crease 267 is formed before folding, so the folding position can be clearly and accurately known and the folding is easier. Of course, the third crease 267 may not be formed between the second separation portion 2622 and the first separation portion 2621, and when the second separation portion 2622 is required to be folded relative to the first separation portion 2621, a folding position is determined according to actual needs, and a crease is formed after folding. FIG. 10 shows a state after the second separation portion 2622 is folded relative to the first separation portion 2621.

Of course, if the two first side surfaces 221 are the outer side surfaces of the two bent portions II, the two first side surfaces 221 are the two outer side surfaces of the straight portion I.

The second insulator 26 further includes second separation portions 2622, the second separation portions 2622 are used for separating the second side surfaces 222 from the shell 21, so that the second insulating portion 262 separates the side wall 213 of the electrode assembly 22 from the shell 21 to reduce the risk of a short circuit inside the battery cell 20.

Of course, in other embodiments, the first insulating portion 261, the folding portion 263, the first partition portion 2621, and the second partition portion 2622 may alternatively have other arrangement relationships.

Figure 11:
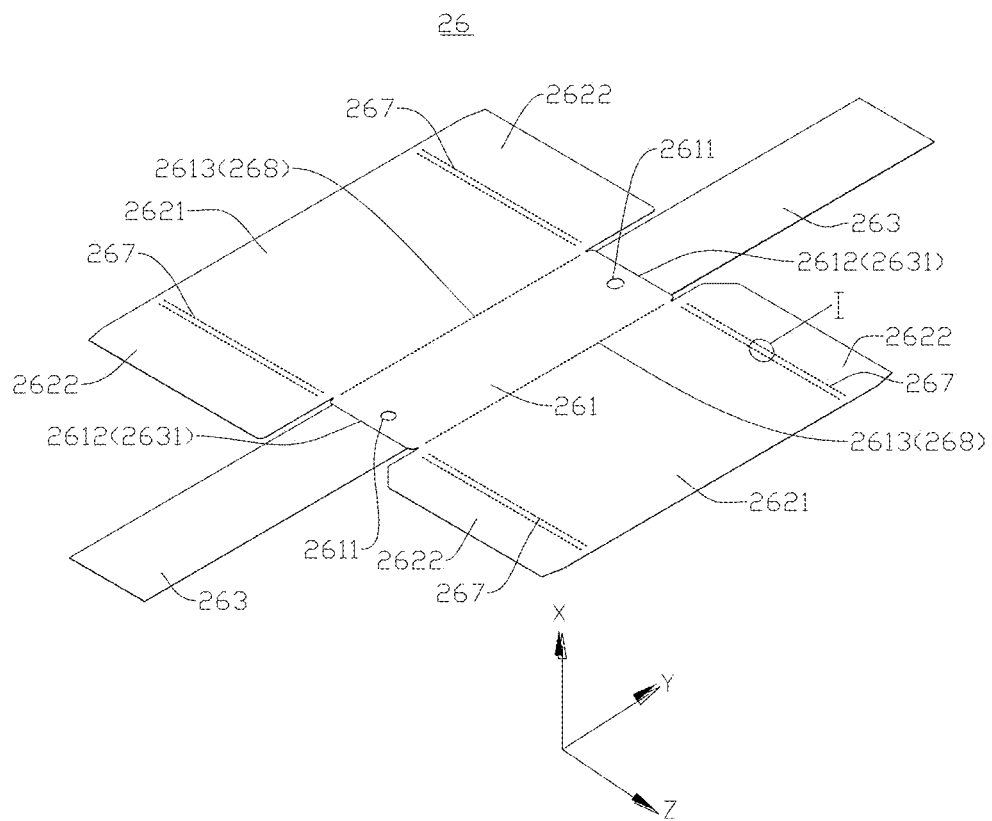
FIG. 11 is a schematic diagram of an unfolded state of an insulator according to other embodiments of the present application.

For example, as shown in FIG. 11, the electrode assembly 22 has two first side surfaces 221 disposed opposite in the third direction Z; the second insulating portion 262 includes two first separation portions 2621, and the two first separation portions 2621 are used for covering the two first side surfaces 221 separately; the two first separation portions 2621 are separately connected to two opposite second edge portions 2613 of the first insulating portion 261 in the third direction Z; and the thickness direction of the first insulating portion 261, the second direction Y, and the third direction Z are perpendicular to each other.

The two folding portions 263 are separately connected to the two opposite first edge portions 2612 of the first insulating portion 261 in the second direction Y in a foldable manner, and the first crease 265 formed at the connection position between the folding portion 263 and the first edge portion 2612 extends in the third direction Z. The two first separation portions 2621 are separately connected to the two opposite second edge portions 2613 of the first insulating portion 261 in the third direction Z, a fourth crease 268 is formed at the connection position between the first separation portion 2621 and the second edge portion 2613, and the fourth crease 268 extends in the second direction Y when the insulator 26 is in the unfolded state.

The third direction Z is perpendicular to the second direction Y, and the folding portion 263 and the first separation portion 2621 are connected to different directions and positions of the first insulating portion 261 separately, which can reduce folding difficulty of the folding portion 263 and a risk of mutual interference when the folding portion 263 and the first separation portion 2621 are folded.

With continued reference to FIG. 11, the electrode assembly 22 includes two second side surfaces 222 arranged opposite in the second direction Y; the second insulating portion 262 further includes second separation portions 2622, two ends of each first separation portion 2621 in the second direction Y are connected with the second separation portions 2622, and the second separation portions 2622 are used for covering the second side surfaces 222; and the thickness direction of the first insulating portion 261, the second direction Y, and the third direction Z are perpendicular to each other.

A crease (the third crease 267 in FIG. 11) is formed at the connection position between the second separation portion 2622 and the first separation portion 2621. The second separation portion 2622 may be folded around the crease relative to the second separation portion 2622. After the second separation portion 2622 can cover the second side surface 222, the crease extends in the first direction X. The creases of the first separation portion 2621 and the second separation portion 2622 are formed before folding, so the folding positions can be clearly and accurately known and the folding is easier. Of course, the third crease 267 may not be formed between the second separation portion 2622 and the first separation portion 2621, and when the second separation portion 2622 is required to be folded relative to the first separation portion 2621, a folding position is determined according to actual needs, and a crease is formed after folding.

Figure 12:
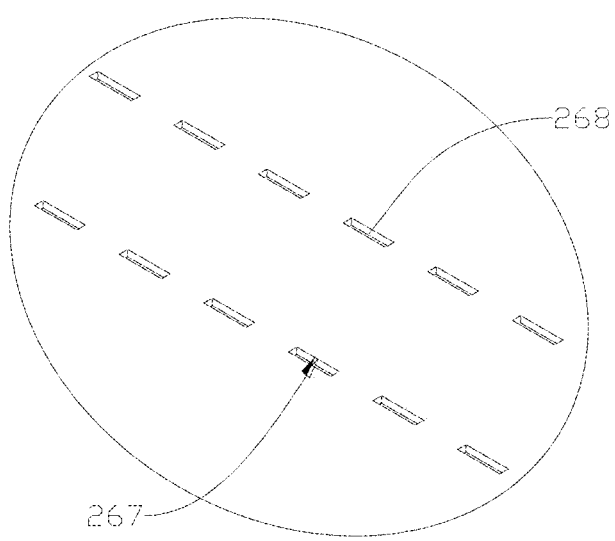
FIG. 12 is an enlarged view of part I in FIG. 11.

It should be noted that the first crease 265, the second crease 266, the third crease 267, and the fourth crease 268 involved in the embodiments of the present application may be in various forms. For example, the fourth crease 268 is a groove formed at the connection position between the first separation portion 2621 and the second separation portion 2622. For another example, as shown in FIG. 12, a plurality of perforations 269 arranged at intervals are formed at the connection position between the first separation portion 2621 and the second separation portion 2622, where the plurality of perforations 269 may be arranged at intervals in the extension direction of the third crease 267 as needed. In FIG. 11, when the insulator 26 is in the unfolded state, the third crease 267 extends in the third direction Z. Therefore, when the insulator 26 is in the unfolded state, the plurality of perforations 269 may be arranged at intervals in the third direction Z. The forms of the first crease 265, the second crease 266, and the fourth crease 268 may refer to the design of the third crease 267.

The second insulator 26 further includes second separation portions 2622, and the second separation portions 2622 are used for separating the second side surfaces 222 from the side wall 213 of the shell 21, so that the second insulating portion 262 separates the side wall 213 of the electrode assembly 22 from the shell 21 to reduce the risk of a short circuit inside the battery cell 20.

There is a transition surface 214 (shown in FIG. 5) at the connection position between the side wall 213 and bottom wall 212 of the shell 21. Specifically, an inner surface of the side wall 213 and an inner surface of the bottom wall 212 are connected through the transition surface 214 to increase the strength of the connection position between the side wall 213 and the bottom wall 212. The transition surface 214 may be an inclined or arc-shaped surface. In the presence of the transition surface 214, an area, opposite to the transition surface 214, of the electrode assembly 22 will be folded by extrusion of the transition surface 214, resulting in a short circuit inside the battery cell 20.

On this basis, with reference to FIG. 5, in some embodiments, the inner surface of the side wall 213 and the inner surface of the bottom wall 212 are connected by the arc-shaped transition surface 214; and the first insulating portion 261 and the folding portion 263 are configured to change a height position of the electrode assembly 22 relative to the bottom wall 212, so as to prevent the arc-shaped transition surface 214 from extruding the electrode assembly 22.

The height position of the electrode assembly 22 relative to the bottom wall 212 refers to a position corresponding to the difference in distance between the electrode assembly 22 and the bottom wall 212 in the first direction X. The first insulating portion 261 is disposed between the electrode assembly 22 and the bottom wall 212, so that the electrode assembly 22 is further from the bottom wall 212, and the electrode assembly 22 may be separated from the arc-shaped transition surface 214 to prevent the arc-shaped transition surface 214 from extruding the electrode assembly 22.

In some embodiments, in the first direction X, both the folding portion 263 and the first insulating portion 261 are located between the electrode assembly 22 and the bottom wall 212, and the distance between the electrode assembly 22 and the bottom wall 212 in the first direction X is a sum of sizes of the folding portion 263 and the first insulating portion 261 in the first direction X. In other embodiments, in the first direction X, only the first insulating portion 261 is located between the electrode assembly 22 and the bottom wall 212, the folding portion 263 is not located between the electrode assembly 22 and the bottom wall 212, and the distance between the electrode assembly 22 and the bottom wall 212 in the first direction X is the size of the first insulating portion 261 in the first direction X.

The first insulating portion 261 is disposed between the bottom wall 212 of the shell 21 and the electrode assembly 22, which can not only separate the bottom wall 212 from the electrode assembly 22 to reduce the risk of a short circuit inside the battery cell 20, but also can change the height position of the electrode assembly 22 relative to the bottom wall 212 to prevent the arc-shaped transition surface 214 from extruding the electrode assembly 22 and reduce the risk of wrinkling of electrode plates due to interference between the electrode assembly 22 and the arc-shaped transition surface 214.

An embodiment of the present application provides a battery 100, including the battery cell 20 provided by any of the foregoing embodiments.

The through hole 2611 of the insulator 26 of the battery cell 20 is covered by the folding portion 263, and ions of the electrode assembly 22 cannot arrive at the shell 21 via the through hole 2611, which reduces the risk of a short circuit inside the battery cell 20, thereby improving safety performance of the battery 100.

An embodiment of the present application provides a power consumption device, including the battery 100 provided in the foregoing embodiment.

The power consumption device includes the battery 100 provided in the foregoing embodiment, where the battery 100 has low risk of internal short circuits and high safety performance, which can improve electrical safety of the power consumption device.

Figure 13:
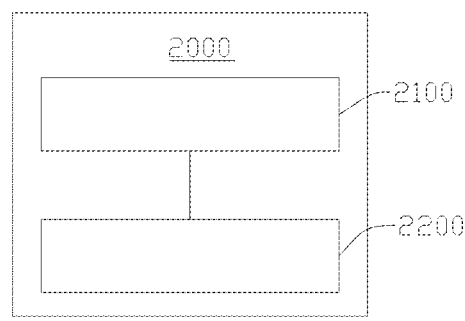
FIG. 13 is a schematic structural diagram of a battery cell manufacturing device according to some embodiments of the present application.

As shown in FIG. 13, an embodiment of the present application provides a battery cell manufacturing device 2000. The battery cell manufacturing device 2000 includes a provision apparatus 2100 and an assembly apparatus 2200; the provision apparatus 2100 is configured to provide a shell 21, an electrode assembly 22, and an insulator 26, where the shell 21 includes a bottom wall 212 and a side wall 213 disposed at a periphery of the bottom wall 212, the insulator 26 includes a first insulating portion 261 and a second insulating portion 262 that are connected, and the first insulating portion 261 is provided with a through hole 2611; the assembly apparatus 2200 is configured to wrap the insulator 26 at a periphery of the electrode assembly 22 and dispose the electrode assembly 22 inside the shell 21, so that the first insulating portion 261 separates the electrode assembly 22 from the bottom wall 212 and the second insulating portion 262 separates the electrode assembly 22 from the side wall 213; and the insulator 26 further includes a folding portion 263, the folding portion 263 may be disposed on the first insulating portion 261 in a foldable manner, and the folding portion 263 is configured to be stacked with the first insulating portion 261 to cover the through hole 2611.

Figure 14:
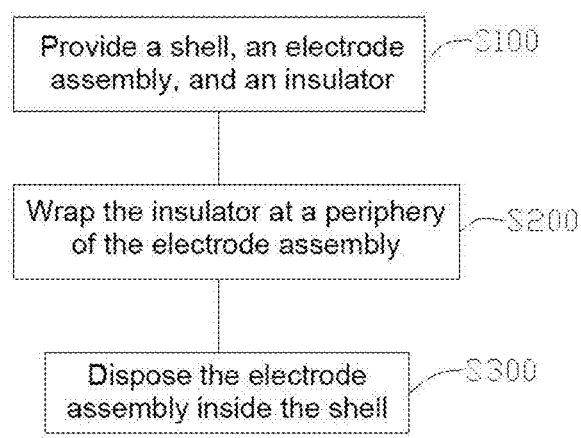
FIG. 14 is a flowchart of a battery cell manufacturing method according to some embodiments of the present application.

As shown in FIG. 14, an embodiment of the present application further provides a manufacturing method for a battery cell 20. The manufacturing method for the battery cell 20 includes:

Step S100: providing a shell 21, an electrode assembly 22, and an insulator 26, where the shell 21 includes a bottom wall 212 and a side wall 213 disposed at a periphery of the bottom wall 212, the insulator 26 includes a first insulating portion 261 and a second insulating portion 262 that are connected, and the first insulating portion 261 is provided with a through hole 2611;

Step S200: wrapping the insulator 26 at a periphery of the electrode assembly 22; and Step S300: disposing the electrode assembly 22 inside the shell 21, so that the first insulating portion 261 separates the electrode assembly 22 from the bottom wall 212 and the second insulating portion 262 separates the electrode assembly 22 from the side wall 213.

The insulator 26 further includes a folding portion 263, the folding portion 263 may be disposed on the first insulating portion 261 in a foldable manner, and the folding portion 263 is configured to be stacked with the first insulating portion 261 to cover the through hole 2611.

Step S300 is performed after step S200, and in step S300, disposing the electrode assembly 22 inside the shell 21 may be understood as disposing the electrode assembly 22 wrapped with the insulator 26 inside the shell 21.

An embodiment of the present application provides a square shell battery. The square shell battery includes a shell 21, an electrode assembly 22, and an insulator 26. The insulator 26 includes a first insulating portion 261, a second insulating portion 262, and two folding portions 263, which are integrally formed. The first insulating portion 261 is provided with a through hole 2611, first ends 2631 of the two folding portions 263 are separately connected to two opposite first edge portions 2612 of the first insulating portion 261 in a second direction Y, and the two folding portions 263 are separately folded in opposite directions relative to the first insulating portion 261, so that the two folding portions 263 are separately located on two opposite sides of the first insulating portion 261 in a first direction X to cover the through hole 2611.

The second insulating portion 262 includes two first separation portions 2621 and four second separation portions 2622, where the two first separation portions 2621 are connected to second ends 2632, opposite to the first ends 2631, of the folding portions 263 in a foldable manner. The two first separation portions 2621 are separately used for covering two outer side surfaces of a straight portion I of the electrode assembly 22. Two second separation portions 2622 among the four second separation portions 2622 are connected to two ends of one of the first separation portions 2621 in a third direction Z in a foldable manner, while the other two second separation portions 2622 among the four second separation portions 2622 are connected to two ends of the other first separation portion 2621 in the third direction Z in a foldable manner. The two second separation portions 2622 are separately used for covering outer side surfaces of two bent portions II of the electrode assembly 22. In the third direction Z, the two second separation portions 2622 located on the same side as the two first separation portions 2621 jointly cover the outer side surface of the same bent portion II, and the two second separation portions 2622 covering the outer side surface of the same bent portion II overlap with each other in the second direction Y to fully cover a second side surface 222. Every two of the first direction X, the second direction Y, and the third direction Z are perpendicular to each other.

Alternatively, the second insulating portion 262 includes two first separation portions 2621 and four second separation portions 2622, where the two first separation portions 2621 are separately connected to two opposite second edge portions 2613 of the first insulating portion 261 in the third direction Z in a foldable manner. The two first separation portions 2621 are separately used for covering two outer side surfaces of a straight portion I of the electrode assembly 22. Two second separation portions 2622 among the four second separation portions 2622 are connected to two ends of one of the first separation portions 2621 in the second direction Y in a foldable manner, while the other two second separation portions 2622 among the four second separation portions 2622 are connected to two ends of the other first separation portion 2621 in the second direction Y in a foldable manner. The two second separation portions 2622 are separately used for covering outer side surfaces of two bent portions II of the electrode assembly 22. In the second direction Y, the two second separation portions 2622 located on the same side as the two first separation portions 2621 jointly cover the outer side surface of the same bent portion II, and the two second separation portions 2622 covering the outer side surface of the same bent portion II overlap with each other in the second direction Y to fully cover the second side surface 222. Every two of the first direction X, the second direction Y, and the third direction Z are perpendicular to each other.

When the folding portion 263 is in the stacked state relative to the first insulating portion 261, the folding portion 263 can cover the through hole 2611, so that ions of the electrode assembly 22 cannot arrive at the shell 21 via the through hole 2611, which reduces the risk of a short circuit inside the battery cell 20.

Described above are merely some embodiments of the present application, and the present application is not limited thereto. Various modifications and variations may be made to the present application for those skilled in the art. Any modifications, equivalent substitutions, improvements, and the like made within the spirit and principle of the present application shall fall within the protection scope of the present application.

What is claimed is:

1. A battery cell, comprising:
   a shell, comprising a bottom wall and a side wall disposed at a periphery of the bottom wall;
   an electrode assembly, accommodated in the shell; and
   an insulator, comprising:
      a first insulating portion and a second insulating portion that are connected, wherein the first insulating portion is configured to separate the electrode assembly from the bottom wall, the first insulating portion is provided with a through hole, and the second insulating portion is configured to separate the electrode assembly from the side wall; and
      a folding portion, wherein the folding portion is disposed on the first insulating portion in a foldable manner, and the folding portion is configured to be stacked with the first insulating portion to cover the through hole, the folding portion is disposed between the first insulating portion and the electrode assembly to cover the through hole and separate the electrode assembly from the first insulating portion.

2. The battery cell according to claim 1, wherein the insulator comprises a plurality of folding portions, which are stacked or arranged side by side.

3. The battery cell according to claim 2, wherein the first insulting portion is provided with a plurality of through holes, and each folding portion covers each through hole.

4. The battery cell according to claim 2, wherein in a first direction, some of the plurality of folding portions are located on one side of the first insulating portion, the other of the plurality of folding portions are located on the other side of the first insulating portion, and the first direction is a thickness direction of the first insulating portion.

5. The battery cell according to claim 1, wherein the insulator comprises two folding portions, the first insulating portion has two first edge portions arranged opposite in a second direction, one ends of the two folding portions in the second direction are separately connected to the two first edge portions in a foldable manner, and the second direction is perpendicular to a thickness direction of the first insulating portion.

6. The battery cell according to claim 5, wherein the electrode assembly has two first side surfaces disposed opposite in the second direction; and
   the second insulating portion comprises two first separation portions, the two first separation portions are configured for covering the two first side surfaces separately, the two first separation portions are connected to the two folding portions separately, a first end of each of the folding portions is connected to the first insulating portion in a foldable manner, and a second end, opposite to the first end, of each of the folding portions is connected to a corresponding first separation portion.

7. The battery cell according to claim 6, wherein a first crease is formed at a connection position between each of the folding portions and a corresponding first edge portion, and/or a second crease is formed at a connection position between each of the first separation portion and a corresponding folding portion; and
   the first crease and the second crease extend in a third direction, and a thickness direction of the first insulating portion, the second direction, and the third direction are perpendicular to each other.

8. The battery cell according to claim 6, wherein the electrode assembly comprises two second side surfaces arranged opposite in a third direction;
   the second insulating portion further comprises second separation portions, two ends of each of the first separation portions in the third direction are connected with the second separation portions, and the second separation portions are configured for covering the second side surfaces; and
   a thickness direction of the first insulating portion, the second direction, and the third direction are perpendicular to each other.

9. The battery cell according to claim 5, wherein the electrode assembly has two first side surfaces disposed opposite in a third direction;
   the second insulating portion comprises two first separation portions, and the two first separation portions are configured for covering the two first side surfaces separately; and
   the two first separation portions are separately connected to two opposite second edge portions of the first insulating portion in the third direction, and a thickness direction of the first insulating portion, the second direction, and the third direction are perpendicular to each other.

10. The battery cell according to claim 9, wherein the electrode assembly comprises two second side surfaces arranged opposite in the second direction;
    the second insulating portion further comprises second separation portions, two ends of each of the first separation portion in the second direction are connected with the second separation portions, and the second separation portions are configured for covering the second side surfaces; and
    the thickness direction of the first insulating portion, the second direction, and the third direction are perpendicular to each other.

11. The battery cell according to claim 1, wherein an inner surface of the side wall and an inner surface of the bottom wall are connected by an arc-shaped transition surface; and
    the first insulating portion and the folding portion are configured to change a height position of the electrode assembly relative to the bottom wall, so as to prevent the arc-shaped transition surface from extruding the electrode assembly.

12. A battery, comprising the battery cell according to claim 1.

13. A power consumption device, comprising the battery according to claim 12.

14. A battery cell manufacturing device for the battery cell according to claim 1, comprising:
    a provision apparatus, configured to provide the shell, the electrode assembly, and the insulator; and
    an assembly apparatus, configured to wrap the insulator at a periphery of the electrode assembly and dispose the electrode assembly inside the shell, so that the first insulating portion separates the electrode assembly from the bottom wall and the second insulating portion separates the electrode assembly from the side wall.

15. A battery cell manufacturing method of the battery cell according to claim 1, comprising:
    providing the shell, the electrode assembly, and the insulator;
    wrapping the insulator at a periphery of the electrode assembly; and
    disposing the electrode assembly inside the shell, so that the first insulating portion separates the electrode assembly from the bottom wall and the second insulating portion separates the electrode assembly from the side wall.

16. A battery cell, comprising:
a shell, comprising a bottom wall and a side wall disposed at a periphery of the bottom wall;
an electrode assembly, accommodated in the shell; and
an insulator, comprising:
  a first insulating portion and a second insulating portion that are connected, wherein the first insulating portion is configured to separate the electrode assembly from the bottom wall, the first insulating portion is provided with a through hole, the through hole is not at an edge of the first insulating portion, and the second insulating portion is configured to separate the electrode assembly from the side wall; and
  a folding portion, wherein the folding portion is disposed on the first insulating portion in a foldable manner, and the folding portion is configured to be stacked with the first insulating portion to cover the through hole.

17. A battery cell, comprising:
a shell, comprising a bottom wall and a side wall disposed at a periphery of the bottom wall;
an electrode assembly, accommodated in the shell; and
an insulator, comprising:
  a first insulating portion and a second insulating portion that are connected, wherein the first insulating portion is configured to separate the electrode assembly from the bottom wall, the first insulating portion is provided with a through hole, and the second insulating portion is configured to separate the electrode assembly from the side wall; and
  a plurality of folding portions, wherein the plurality of folding portions are stacked in a direction from the bottom wall to the electrode assembly, and disposed on the first insulating portion in a foldable manner, and the plurality of folding portions are configured to be stacked with the first insulating portion to cover the through hole.

* * * * *